Sept. 27, 1966 E. HONORÉ ET AL 3,276,009

ANALOG-TO-DIGITAL CONVERTERS

Filed Jan. 29, 1963 6 Sheets-Sheet 1

ANALOG-TO-DIGITAL CONVERTERS

United States Patent Office 3,276,009 Patented Sept. 27, 1966

3,276,009

ANALOG-TO-DIGITAL CONVERTERS

Etienne Honoré and Emile Torcheux, Paris, France, assignors to C.S.F.-Compagnie Generale de Telegraphie Sans Fil, a corporation of France, and Societe Marocaine de Recherches d'Etudes et de Developpements, "Somarede," a corporation of Morocco Filed Jan. 29, 1963, Ser. No. 254,657
Claims priority, application France, Jan. 31, 1962, 886,465
10 Claims. (Cl. 340—347)

The present invention relates to systems for converting analog magnitudes, such as voltages or mechanical magnitudes, and more particularly variable analog magnitudes, into digital magnitudes or for effecting the reverse operation.

It is an object of the invention to provide such a system having a particularly simple structure and operating in a reflected binary code.

A system according to the invention comprises:

(a) Means for comparing an analog magnitude $x$, comprised between —K and +K with a sum S of $n$ discrete values, such that $$S=\pm\left[\frac{K}{2}\pm\frac{K}{4}\pm\ ----\ \pm\frac{K}{2^n}\right]$$

thus providing a voltage $\epsilon$ comprised between $$-\frac{K}{2^n}\text{ and }+\frac{K}{2^n}$$

and representing $x$–S.

The above means may comprise cascade connected polarity inverters having a "plus" position and a "minus" position alternated with computer devices operating as subtractors or adders for comparing $x$ to S, as expressed by the above equation.

(b) A threshold device which receives voltage $\epsilon$, and has two outputs which deliver respectively a control pulse, when $$\epsilon>+\frac{K}{2^n}$$

and $$\epsilon<-\frac{K}{2^n}$$

(c) Cascade connected flip-flop systems which have a "0" stable state and a "1" stable state, each flip-flop controls the inverter associated with the comparator device which is used for introducing into the comparison of X with S, a value which corresponds to the digit, whose 0 or 1 value is represented by this flip-flop, the flip-flops being actuated in a step by step manner by signal $\epsilon$.

The invention will be best understood from the following description and appended drawing, wherein.

The same reference numbers designate the same elements throughout all the figures.

Figure 1:
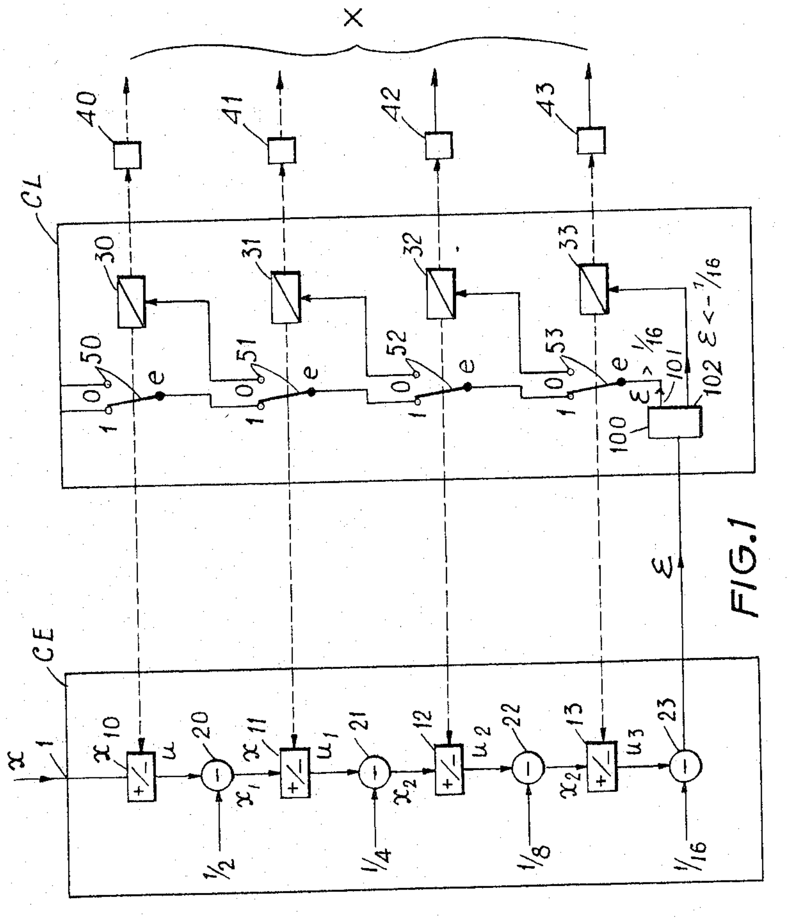
FIG. 1 shows, very diagrammatically, a first embodiment of a system according to the invention.

The system shown in FIG. 1 comprises two sub-assemblies CE and CL. Sub-assembly CE includes an input 1 to which is applied an analog voltage value $x$ of fixed frequency and phase and of variable amplitude, which may be measured in terms of the amplitude of a voltage $u_0$ taken as unity.

Sub-assembly CE delivers a voltage $\epsilon$ to sub-assembly CL. The latter comprises logical circuits which are actuated by voltage $\epsilon$, when the value of the latter exceeds predetermined limits. These logical circuits react in turn on the electric circuits of the sub-assembly CE to bring the value of $\epsilon$ within the above limits, while delivering digital signals X representative of the value of $x$ for example in a reflected or cyclic permutation binary code.

The two sub-assemblies CE and CL will be described in turn.

Sub-assembly CE comprises $n$ polarity of inverters 10, 11, 12, 13 and $n$ subtractor units 20, 21, 22, 23. Inverters and subtractors are cascade connected between the input and the output of the sub-assembly, the subtractors alternating with the inverters. Both are of any known type and $n$ is for example equal to four.

The subtractors may be, for example, the networks described in the U.S. Patent 2,785,853. They comprise two inputs which receive respectively voltages $u$ and $v$ and deliver at their output voltage $u—v$.

Inverter 10 receives voltage $x$ and delivers a voltage $u=\pm x$, according to the manner in which it is adjusted. Subtractor 20 receives voltage $u$ from inverter 10 and voltage $v_1$ with $v_1=\frac{1}{2}$. It delivers voltage $x_1=u-\frac{1}{2}$ to inverter 11, which in turn delivers $u_1=\pm x_1$ to subtractor 21. The latter receives voltage $$\frac{1}{4}=\frac{1}{2^2}$$

thus delivering voltage $u_1—\frac{1}{4}$.

Generally an inverter $p$ receives voltage $x_p$ and delivers voltage $u_p=\pm x_p$ to subtractor $2p$ which also receives voltage $1/2^{p+1}$ and delivers voltage $$x_{p+1}=u_p-\frac{1}{2^{p+1}}$$

This voltage $x_{p+1}$ is applied to the input of the last inverter, i.e., inverter $1.p+1$ or inverter 13 in FIG. 1. The last subtractor $2.n-1$, i.e., subtractor 23 in FIG. 1, receives the voltage $u_{n-1}$ and voltage $1/2^n$. It delivers the voltage $$\epsilon=u_{n-1}-\frac{1}{2^n}$$

with $n=4$, i.e. $\epsilon=u_3—\frac{1}{16}$.

This voltage $\epsilon$ is applied to the sub-assembly CL.

Sub-assembly CL comprises a threshold device 100 which receives voltage $\epsilon$. This device has two outputs 101 and 102; output 101 delivers a pulse when voltage $\epsilon$ is higher than $1/2^n$, i.e., when $$\epsilon>\frac{1}{2^4}=\frac{1}{16}$$

in the present instance.

Output 102 delivers a pulse when voltage $\epsilon$ is lower than $$-\frac{1}{2^n}$$

i.e., when $$\epsilon<-\frac{1}{2^4}=-\frac{1}{16}$$

in the present instance.

Sub-assembly CL comprises $n$ bistable devices, say devices 30, 31, 32 and 33. These trigger or flip-flop circuits are of any conventional type and are tripped from state 0 or 1 to state 1 or 0 by an incoming pulse.

Each bistable device comprises an indicator 40 to 43, which indicates the state thereof, which is either 0 or 1.

The output X provided by the sub-assembly CL thus consists of a sequence of digits 1 and 0; the notation used being a reflected or cyclic permutation binary notation. Trigger circuits 30 to 33 respectively control contactors 50 to 53.

Each contactor has an input $e$ and two outputs 1 and 0. In the "1" state, it connects its input $e$ with input $e$ of the next contactor. In the "0" state, it connects its input $e$ with its output 0 to which the next flip-flop is connected.

The first contactor, i.e., contactor 53 and the first flip-flop, i.e., flip-flop 33, have their inputs respectively connected to the two outputs 101 and 102 of the threshold device 100.

Each flip-flop controls the inverter of the same order; i.e., flip-flops 30 to 33 respectively control inverters 10 to 13.

Each inverter inverses the polarity of its input voltage, when the flip-flop, which controls it, is in the 0 state and passes it with the same polarity, if the flip-flop is in the "1" state.

The operation of the device will now be described. It will be assumed by way of example that the input voltage $x$ is comprised within the interval $-1<x<1$. The sensitivity threshold of the threshold device 100 is such that it delivers no output signal when signal $\epsilon$ is comprised within the voltage value interval limited by $$-\frac{1}{2^n} \text{ and } +\frac{1}{2^n}, \text{ i.e., } -\frac{1}{16} \text{ and } +\frac{1}{16}$$

in the present instance.

When this is so, the assembly has reached an equilibrium state, since no control signal is applied to any one of the flip-flops 33 to 30, whose respective positions, as indicated by the assembly of indicators 43 to 40, provide a digital representation of the voltage $x$ which has thus been converted from an analog to a digital value.

Figure 2:
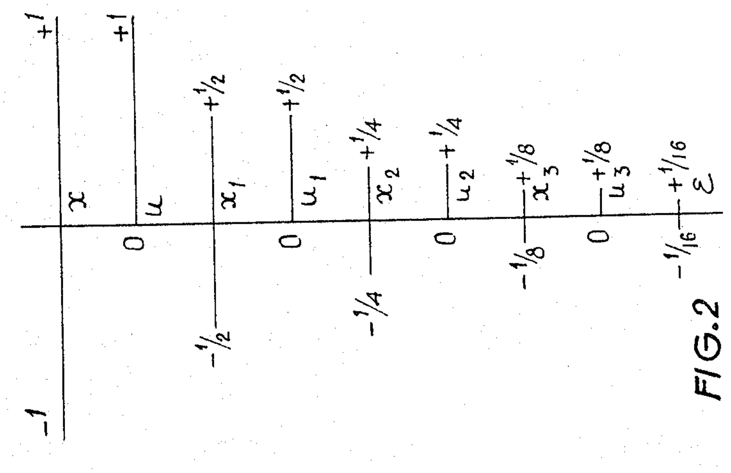
FIGS. 2 and 3 are explanatory graphs.

Signal $\epsilon$ being comprised between $-1/16$ and $+1/16$, the signal $u_3$ at the output of inverter 13, is comprised between 0 and $1/8$ as indicated in the chart of FIG. 2.

According to the position of inverter 13, the value of the voltage $x_2$ applied to the input thereof is $$-1/8<x_2<1/8$$

In the same manner, voltage $u_2$ at the output of the inverter 12 is comprised between 0 and $1/4$.

It would appear in the same manner that respective values of signals $x$, $u$, $x_1$, $u_1$ and $x_2$ are those given in FIG. 2.

Thus, the following relations exist:

$$u=|x|$$
$$x_1=u-1/2$$
$$u_1=|u-1/2|$$
$$x_2=u-1/4$$
$$u_2=|u_1-1/4|$$
$$x_3=u_2-1/8$$
$$u_3=|u_2-1/8|$$
$$\epsilon=u_3-1/16$$

It will now be assumed that $x$ varies continuously from $-1$ to $+1$.

FIGS. 3*a* to 3*i* show the respective variations of $x$, $u$, $x_1$, $u_1$, $x_2$, $u_2$, $x_3$, $u_3$, and $\epsilon$ as a function of $x$.

All these curves are straight line segments of slopes $+1$ or $-1$.

Curve (*a*) represents the variations of $x$ as a function of $x$.

Curve (*b*) represents the variations of $u$ as a function of $x$; $u$ may then be written: $u=|x|$, and accordingly $$u=1 \text{ for } x=\pm 1$$
$$u=0 \text{ for } x=0$$

The curves (*c*), (*d*), (*e*), (*f*), (*g*), (*h*) and (*i*) represent the variations of $x_1$, $u_1$, $x_2$, $u_2$, $x_3$, $u_3$ and $\epsilon$ respectively as a function of ($x$).

In the binary reflex code, which is used in a preferred embodiment of the invention, the values of $x$, while it varies from $-1$ to $+1$ by steps equal to $1/8$, are represented by the following digit configurations:

| Values of $x$ | Number in the reflex binary code X | | | |
|---|---|---|---|---|
| $-1$ | | | | |
| | 0 | 1 | 1 | 1 |
| $-7/8$ | | | | |
| | 0 | 1 | 1 | 0 |
| $-6/8$ | | | | |
| | 0 | 1 | 0 | 0 |
| $-5/8$ | | | | |
| | 0 | 1 | 0 | 1 |
| $-4/8$ | | | | |
| | 0 | 0 | 0 | 1 |
| $-3/8$ | | | | |
| | 0 | 0 | 0 | 0 |
| $-2/8$ | | | | |
| | 0 | 0 | 1 | 0 |
| $-1/8$ | | | | |
| | 0 | 0 | 1 | 1 |
| 0 | | | | |
| | 1 | 0 | 1 | 1 |
| $1/8$ | | | | |
| | 1 | 0 | 1 | 0 |
| $2/8$ | | | | |
| | 1 | 0 | 0 | 0 |
| $3/8$ | | | | |
| | 1 | 0 | 0 | 1 |
| $4/8$ | | | | |
| | 1 | 1 | 0 | 1 |
| $5/8$ | | | | |
| | 1 | 1 | 0 | 0 |
| $6/8$ | | | | |
| | 1 | 1 | 1 | 0 |
| $7/8$ | | | | |
| | 1 | 1 | 1 | 1 |
| 1 | | | | |

Accordingly, when $x$ is to vary from $-1$ to $+1$, i.e., when the initial voltage is $-1$, the flip-flops 30, 31, 32 and 33 must be set respectively in 0, 1, 1 and 1 states.

With the flip-flops in this state, the inverters 10, 11, 12 and 13 are respectively in their minus, plus, plus and plus positions.

It may be readily seen that, under such conditions, one has:

$$x=1 \text{ and } u=+1$$
$$x_1=u_1=1/2$$
$$x_2=u_2=1/4$$
$$x_3=u_3=1/8$$

and $$\epsilon=1/16$$

no pulse is delivered by the threshold device 100 to subassembly CL, which displays the initial digit configuration 0111 and stays unchanged.

This situation is maintained while $x$ increases from $-1$ and as long as it does not exceed $-7/8$. When $x$ exceeds $-7/8$, $\epsilon$ decreases below $-1/16$, a pulse appears at the output 102 of the threshold device 100 and is applied to the flip-flop 33, which is tripped from state 1 to state 0. While the position of flip-flops 32 to 30 remains unchanged and the digit configuration displayed becomes 0110, the inverter 13 passes from the position + to the position − and contactor 53 switches from position 1 to position 0.

Figure 3:
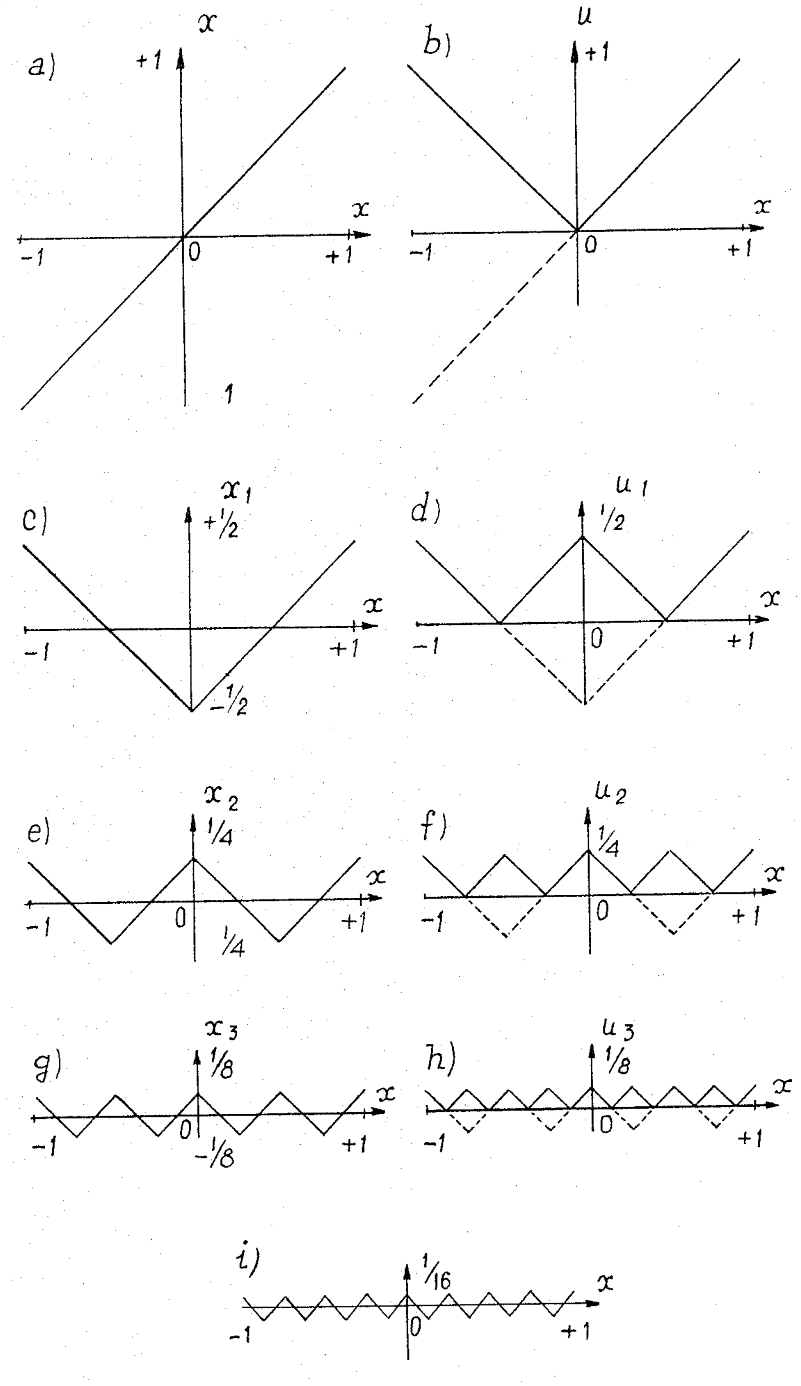

It should be noted that inverter 13 has been switched while voltage $u_3$ was equal to zero as shown in FIG. 3(*h*).

This situation then remains unchanged while $x$ continues to increase and as long as $-7/8<x<-6/8$, $\epsilon$ increasing from $-1/16$ to $+1/16$. When $x$ exceeds $-6/8$ and $\epsilon$ attains $+1/16$, a pulse appears at the output 101. With contactor 53 in position 0, this pulse is applied to the input of the flip-flop 32, which is tripped from state 1 into state 0. Contactor 52 passes from position 1 to position 0 and inverter 12 passes from position + to position −. The digit configuration dispalyed is 0100.

Again, inverter $u_2$ has been switched while voltage $u_2$ was zero, as shown in FIG. 3*f*.

The operation continues in the same way, step by step, the digit configuration displayed being those indicated.

It should be noted that, each time the value of the voltage applied has changed by an amount corresponding to one digit, i.e., 1/8 in the present case, the digit configuration represented by the assembly of indicators 40 to 93 changes only by one digit, which is the essential characteristics of a reflex binary code. Of course, any other initial configurations could be selected, in which case the digit configurations corresponding to each number would of course be different.

Figure 4:
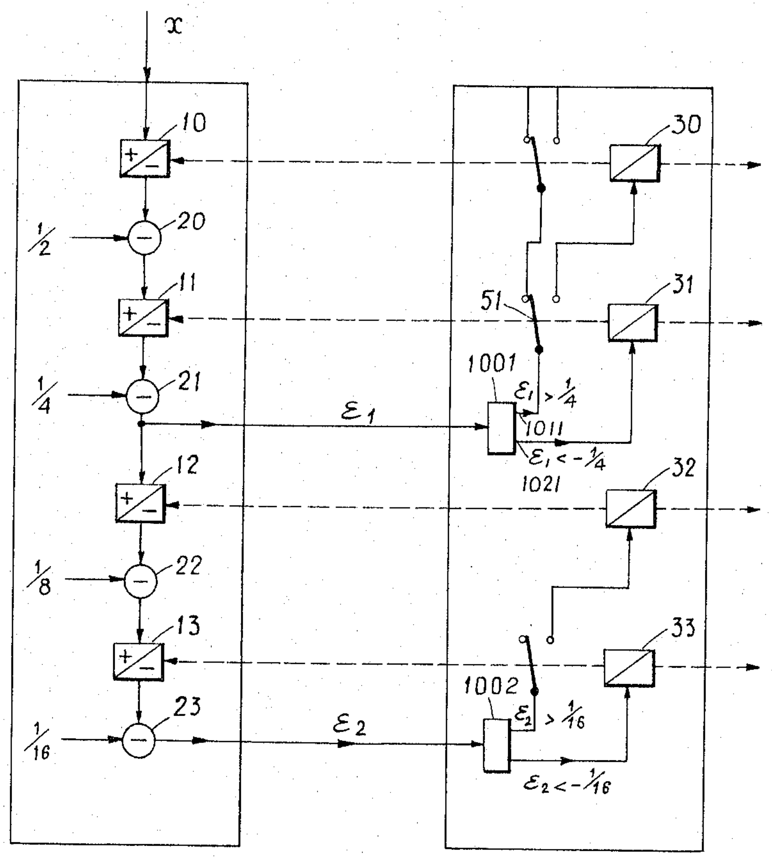
FIGS. 4 and 5 illustrate two alternative embodiments of the system according to the invention.

FIG. 4 represents an arrangement similar to that of FIG. 1, except that there are two threshold devices 1001 and 1002.

Threshold device 1001 is placed at the output of the subtractor unit 21, and threshold device 1002 at the output of the subtractor unit 23.

The input of flip-flop 31 is connected to the output 1021 of the threshold device 1001 and the input of switch 51 to the output 1011 of the same device.

The threshold device 1001 receives the voltage $x_2=\epsilon_1$ and delivers, at its output 1011, a control pulse when $\epsilon_1>1/4$; at its output 1021, it delivers a pulse when $\epsilon_1<-1/4$. These control pulses trip the flip-flops 30 and 31, as previously shown.

The threshold device 1002 operates in the same way as device 100 of FIG. 1 and controls the flip-flops 32 and 33.

The advantage of the arrangement of FIG. 4 lies in that it operates more rapidly, the encoding being effected simultaneously on two sets of flip-flops.

Figure 5:
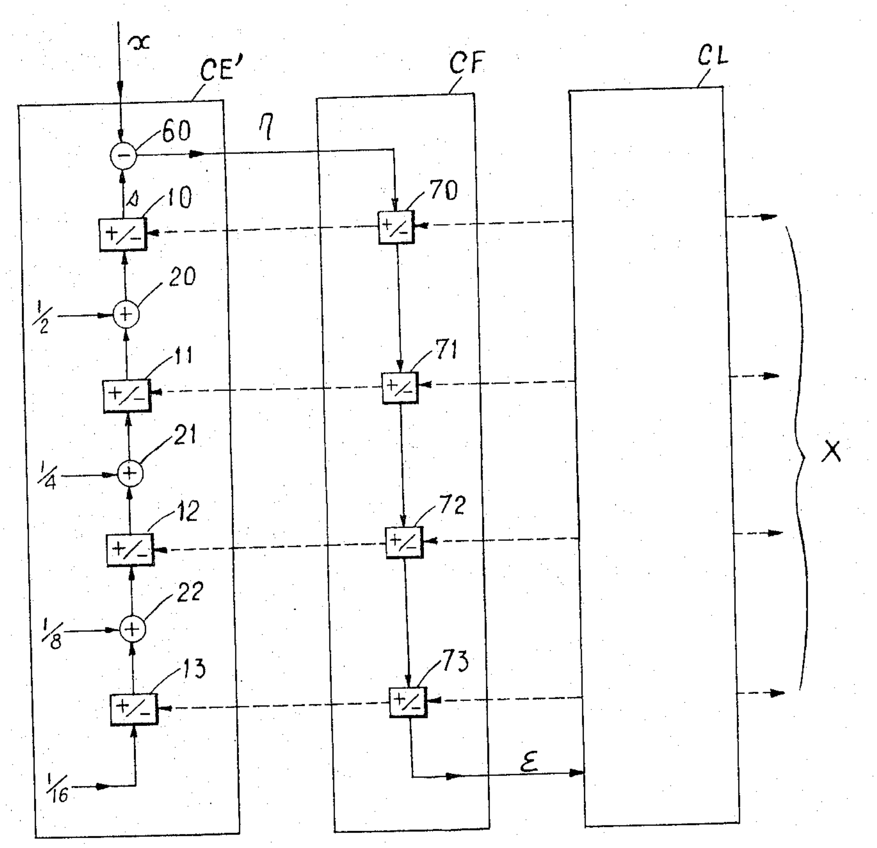

FIG. 5 is another alternative embodiment of the system according to the invention.

It is based on the fact that all the elements buliding up sub-assembly CE of FIG. 1 may be reversible. For example, they may be quadripoles such that, if a voltage $V_e$ is applied to the input thereof, a voltage $V_s$ is collected at the output and conversely if voltage $V_s$ is applied to the output thereof, voltage $V_e$ is collected at their input. This is, of course, true for the inverters. It is also true for the subtractors such as those described in the above mentioned patent.

The sub-assembly CE′ of the system illustrated in FIG. 5 is similar to sub-assembly CE of FIG. 1, except for the following differences:

(a) Assembly CE operates in the direction of the arrows, i.e., in a direction opposite to that of the sub-assembly CE of FIG. 1.

(b) Subtractor 23 is omitted.

(c) Voltage 1/16 is applied to the input of inverter 13.

(d) The device comprises an additional subtractor 60 which is placed between the input and inverter 10, which delivers a voltage S, thus delivering a voltage $\eta=x-S$.

It is obvious that, under such conditions, the subtractors 20, 21 and 22 actually operate as adders and are therefore marked + in the figure.

The system of FIG. 5 in addition comprises four cascade-connected inverters 70 to 73. They are controlled by the same flip-flops as inverters 10 to 13, respectively. Inverter 70 receives voltage $\eta$ and inverter 73 delivers voltage $\epsilon$ which is applied to sub-assembly CL which is entirely identical to that of FIG. 1.

The operation of the assembly is as follows: If the voltage value $x$, say $-1$, is correctly encoded, the respective positions of inverters 10 to 13 are such that no control pulse appears at the output of the threshold device 100. This is to say that voltage $\eta$, which is equal $-\epsilon$, i.e., to $-1/16$, inverter 70 being in the minus position and inverters 71 to 73 in the plus position as inverters 10 to 13 respectively, when $x$ increases, $\eta$ exceeds $+1/16$, the flip-flop 33 trips from state 1 into state 0, passing inverters 13 and 73 from position + to position − and $\eta$ passes from $+1/16$ to $-1/16$ and begins to increase again. At the same time $\eta$ becomes equal to $+\epsilon$ instead of $-\epsilon$ due to the tripping of inverter 73, $\epsilon$ remaining thus equal to $-1/16$ and increasing.

Figure 6:
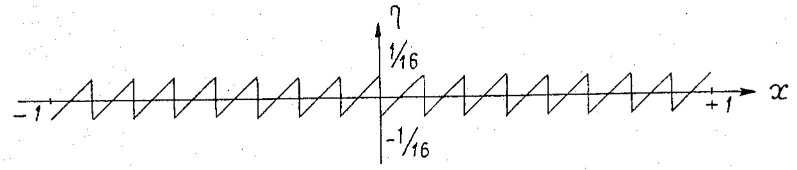
FIG. 6 is an explanatory graph relating to FIG. 5.

In other words, when $x$ increases, $\eta$ increases from $-1/16$ to $+1/16$, admits a discontinuity between $+1/16$ and $-1/16$ and increases in the following interval. This variation is shown in FIG. 6; $\epsilon$ follows the same variations as in the system of FIG. 1 as shown in FIG. 3*i*. The general operation of the system is thus identical to that of FIG. 1. However, the inverter, in sub-assembly CE′, no longer switches when the applied voltages are zero, but with these voltages having an absolute value 1/16.

Figure 7:
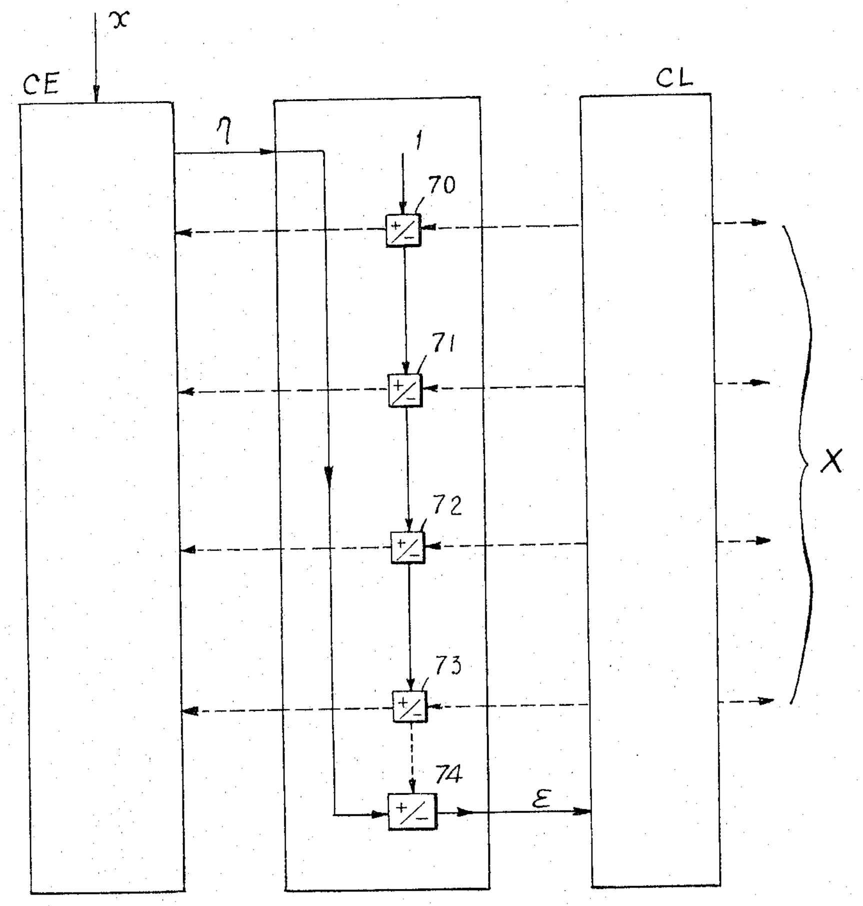
FIG. 7 is an alternative embodiment of the system illustrated in FIG. 5.

FIG. 7 is a variation of the system of FIG. 5. It differs from the latter in that voltage $\eta$ is applied to the input of an additional inverter 74, which is electrically controlled by the assembly of inverters 70 to 73, a voltage being applied to the input of inverter 70. Inverter 74 is in the plus position, when inverter 73 delivers a positive voltage and in the minus position, when it delivers a negative voltage. Inverter 74 receives at its input voltage $\eta$, and delivers at its output voltage $\epsilon=+\eta$ when it is in the plus position, and $\epsilon=-\eta$, when it is in the minus position.

Figure 8:
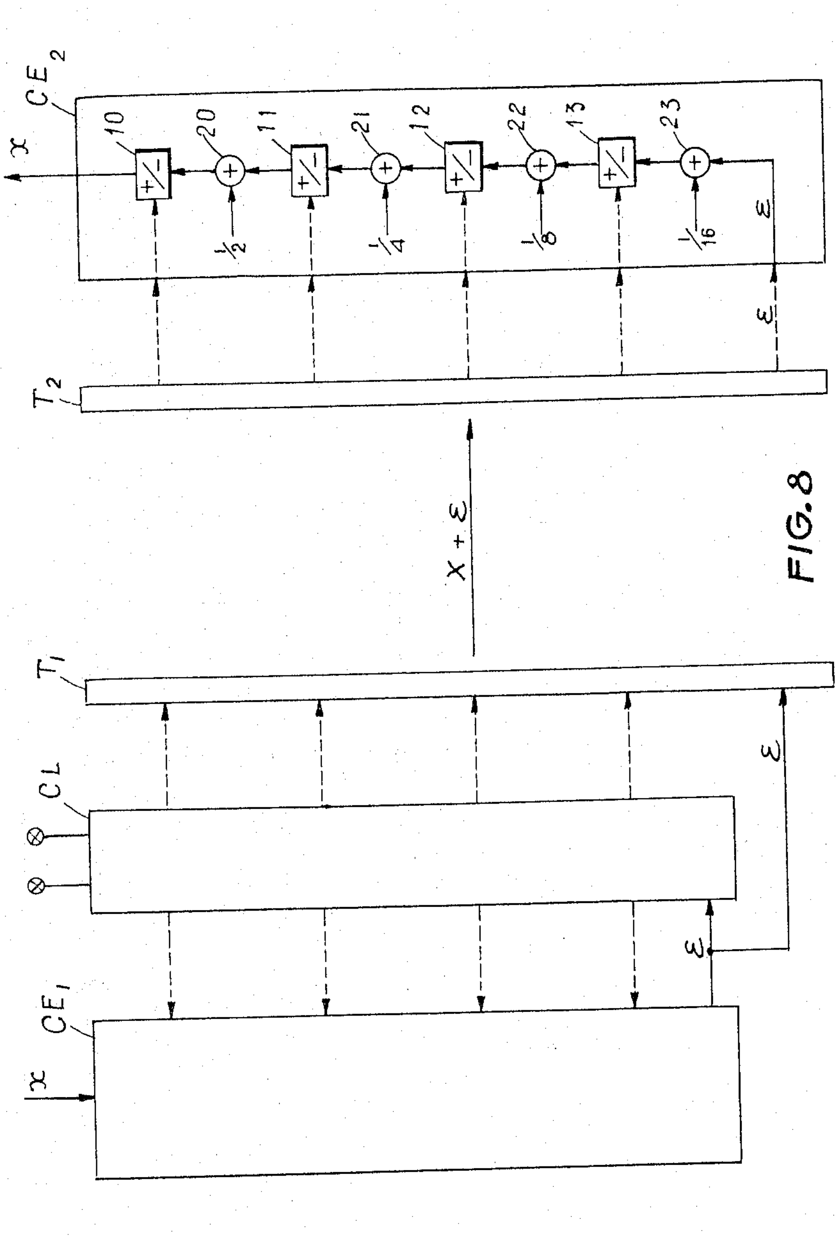
FIG. 8 is an example of the application of the invention.

FIG. 8 shows by way of example, an application of the invention, for transmitting the magnitude $x$ at a distance.

The system comprises a sub-assembly $CE_1$, identical to assembly CE of FIG. 1, which receives the magnitude $x$.

The output voltage $\epsilon$ of sub-assembly $CE_1$ is applied to a sub-assembly CL in the same manner as in FIG. 1.

A transmission system $T_1$, of any known type, transmits digits X and signal $\epsilon$. A receiver system $T_2$, of any known type, receives digits X and signal $\epsilon$, the transmission being effected by any known means, such as radio, cable, etc.

Digits X and voltage $\epsilon$ are then applied to a sub-assembly $CE_2$. Circuit $CE_2$ which is identical to sub-assembly CE but operated in the opposite direction i.e. as in the case of FIG. 5, units 20 to 23 operating as adders. Inverters 10 to 13 are controlled by digits X received by device $T_2$.

Voltage $x$ is collected at the output of inverter 10.

Of course the invention is not limited to the embodiments shown, which were given solely by way of example.

What is claimed is:

1. A system for converting an analog value $x$, comprised between $-K$ and $+K$, into a digital value $x$ including, means for comparing said analog value to a sum S thus providing a value $x-S$, said system comprising: a general input for receiving a voltage proportional to said analog value; a threshold device, having an input for receiving a voltage $\epsilon$, analog to $x-S$ and two outputs, respectively delivering pulses, when $$\epsilon<-\frac{1}{2^n} \text{ or } \epsilon>\frac{1}{2^n}$$

said comparing means including means for generating said voltage $\epsilon$, said means comprising $n$ stages cascade connected to said general input, said stages respectively comprising a polarity inverter, having a polarity inverting position and a polarity non inverting position, an input and an output, and an algebraically additive circuit, having a first input connected to said output of said inverter, and a second input for receiviing a voltage analog to $K/2^j$, $j$ being equal to $1 \ldots n$; $n$ flip-flop devices having a first and a second steady state, and a control input for receiving pulses for tripping them from one state to the other; respective means for putting said polarity inverters in said first or in said second position according to whether said flip-flop devices are respectively in said first or in said second state: a cascade of switches, having respectively inputs, and two outputs, for selectively connecting said outputs of said threshold devices to said control inputs of said flip-flop devices; and means for respectively controlling said switches as a function of the respective states of said flip-flop devices.

2. A system for converting an analog value $x$, comprised between $-K$ and $+K$, into a digital value $x$ including: means for comparing said analog value to a sum S, thus providing a value $x-S$, said system comprising: a general input for receiving a voltage proportional to said analog value; a threshold device, having an input for receiving a voltage $\epsilon$, analog to $x-S$ and two outputs, respectively delivering pulses, when $$\epsilon<-\frac{1}{2^n} \text{ or } \epsilon>\frac{1}{2^n}$$

$n$ cascade connected stages connected between said general input and said input of said threshold device said stages respectively comprising a polarity inverter, having a polarity inverting position and a polarity non inverting position, an input and an output, and a subtracting circuit having a lrst input connected to said output of said output of said inverter, and a second input for receiving a voltage analog to $K/2^j$, $j$ being equal 1 . . . $n$; flip-flop devices, having a first and a second steady state and a control input for receiving pulses tripping them, from one state to the other; respective means for putting said polarity inverters in said first or in said second position, according to whether said flip-flop devices are respectively in said first or in said second state; a cascade of $n$ switches, respectively associated with said flip-flop devices, having respectively an input and a first and a second output, said cascade comprising a first switch; means respectively controlled by said associated flip-flops for selectively connecting said input to said associated first respectively or said second output of switches according to whether said flip-flops are in said first or in said second state; said first switch and the association flip-flop having inputs respectively connected to said first and said second output of said threshold device, said first output of each switch being connected to the input of the next switch in said cascade, its second output being connected to said control input of the flip-flop associated with said next switch.

3. A system for converting an analog value $x$, comprised between —K and +K, into a digital value $x$, including: means for comparing said analog value to a sum S thus providing a value $x-S$, said system comprising: a general input for receiving a voltage proportional to said analog value; a first and a second threshold device, having an input for receiving respectively a voltage $\epsilon$, analog to $K-S$, and a second voltage $\epsilon$, analog to $K-S$, and a second voltage $\epsilon_2$ and two outputs, respectively delivering pulses, when $$\epsilon<-\frac{1}{2^n} \text{ or } \epsilon>\frac{1}{2^n}$$

and $$\epsilon<-\frac{1}{2^n-q} \text{ or } \epsilon>2^n-q$$

$n-q$ stages, cascade connected between said general input and said input of said second threshold device and $q$ stages cascade connected between said $n-q$ stages and said input of said first threshold device, said stages respectively comprising a polarity inverter having a polarity inverting position and a polarity non inverting position, an input and an output, and a subtracting cell, having a first input, connected to said output of said inverter, and a second input for receiving a voltage analog to $K/2^j$, $j$ being equal to 1 . . . $n$; $n$ flip-flop devices having a first and a second steady state, and a control input for receiving pulses, tripping them, from one state to the other; respective means for putting said polarity inverters in said first or in said second position, according to whether said flip-flop devices are respectively in said first or in said second state; a first and a second cascade of respectively $q$ and $n-q$ switches, respectively associated with $q$ and $n-q$ of said flip-flop devices having respectively one input and a first and a second output; means controlled by said associated flip-flop devices for selectively connecting said first or said second outputs to said input of said switch according to whether said associated flip-flop is in said first or in said second state; the first switch in each cascade, and the associated flip-flop, having inputs respectively connected to said first and said second output of said first and said second threshold device, said first output of said switch being connected to the input of the switches following it in said cascade, and said second output to said input of the flip-flop associated to said following switch.

4. A system for converting an analog value $x$, comprised between —K and +K, into a digital value $x$ including: means for comparing said analog value to a sum S thus providing a value $x-S$, said system comprising: a subtracting cell having an input for receiving a voltage proportional to said analog value, and another input and an output; a threshold device, having an input for receiving a voltage $\epsilon$, analog to $x-S$, and two outputs, respectively delivering pulses, when $$\epsilon<-\frac{1}{2^n} \text{ and } \epsilon>\frac{1}{2^n}$$

$n$ stages cascade connected to said other input of said subtracting cell, said stages respectively comprising a polarity inverter, having a polarity inverting position and a polarity non inverting position, and an input and an output, and an additive cell, having a first input connected to said output of said inverter, and a second input for receiving a voltage analog to $K/2^j$, $j$ being equal to 1 . . . $n$; $n$ further polarity inverters having a polarity inverting position and a polarity non inverting position, cascade connected between said output of said subtracting cell, and said input of said threshold device; $n$ flip-flop devices having a first and a second steady state, and a control input for receiving pulses for tripping them from one of said states to the other; respective means for putting said polarity inverters and said further polarity inverters in said first or in said second position, according to whether said flip-flop devices are respectively in said first or in said second state; a cascade of $n$ switches, respectively associated with said flip-flop devices and having respectively one input and a first and a second output; means respectively controlled by said associated flip-flop devices for selectively connecting said first or said second output to said input of said switch according to whether said switch is in said first or in said second state, the first flip-flop device in said cascade and the associated flip-flop having inputs respectively connected to said first and said second outputs of said threshold device; said first output of said switch being connected to the input of the switch following it in the cascade, and said second output to said input of the flip-flop associated to the following switch.

5. A system for converting an analog value $x$, comprised between —K and +K, into a digital value $x$, including: means for comparing said analog value to a sum S thus providing a value $x-S$ said system comprising: a subtracting cell having an input for receiving a voltage proportional to said analog value, another input and an output; a threshold device, having an input for receiving a voltage $\epsilon$, analog to $x-S$, and two outputs, respectively delivering pulses, when $$\epsilon<-\frac{1}{2^n} \text{ or } \epsilon>\frac{1}{2^n}$$

$n$ stages cascade connected to said other input of said subtracting cell, said stages respectively comprising: a polarity inverter having a polarity inverting position and a polarity non inverting position, an input and an output and an algebraically additive device having a first input connected to said output of said inverter, and a second input for receiving a voltage analog to $K/2^j$, $j$ being equal to 1 . . . $n$; another polarity inverter, having a polarity inverting position and a polarity non inverting position, having an input, connected to said output of said cell, and an output connected to said input of said threshold device, and a control input for tripping it from one position into the other; $n$ further polarity inverters, having a polarity inverting position and a polarity non inverting position; means for applying a constant voltage to said last mentioned cascade; said further polarity inverters being cascade connected between said control input of said other polarity inverter and said means; $n$ flip-flop devices, having a first and a second steady state and a control input for receiving pulses tripping them from one state to the other; respective means for putting said polarity inverters in said first or in said second position, according to whether said flip-flop devices are respectively in said first or in said second state; a cascade of $n$ switches, respectively associated with said flip-flop devices, having respectively one input and a first and a second output; means respectively controlled by said associated flip-flop devices for selectively connecting said first or said second output to said input of said switch according to whether said associated flip-flop devices are respectively in said first or in said second state; the first switch in said cascade and the associated flip-flop having inputs respectively connected to said first and said second outputs of said threshold device; said first output of each switch being connected to the input of the switch following it in the cascade, and said second output thereof to said input of the flip-flop associated to said following switch.

6. A system for converting an analog value $x$, comprised between —K and +K, into a digital value $x$, including: means for comparing said analog value to a sum S thus providing a value $x—S$ said system comprising: a general input for receiving a voltage proportional to said analog value; a threshold device, having an input for receiving a voltage $\epsilon$, analog to $K—S$ and two outputs, respectively delivering pulses, when $$\epsilon < -\frac{1}{2^n} \text{ or } \epsilon > \frac{1}{2^n}$$

$n$ stages cascade connected between said general input and said input of said threshold device, said stages respectively comprising a polarity inverter, having a polarity inverting position and a polarity non inverting position, an input and an output, and a subtracting cell, having a first input connected to said output of said inverter, and a second input for receiving a voltage analog to $K/2^j$, $j$ being equal to 1 . . . $n$; $n$ flip-flop devices having a first and a second steady state and a control input for receiving pulses tripping them from one state to the other; respective means for putting said polarity inverters in said first or in said second position, according to whether said flip-flop devices are respectively in said first or in second state; a cascade of $n$ switches, respectively associated with said flip-flop devices, having respectively one input and a first and a second output; means respectively controlled by said associated flip-flop devices, for selectively connecting said first or said second output to said input in each switch, according to whether said flip-flops are respectively in said first or in said second state; the first switch in said cascade and the associated flip flop device having their respective inputs respectively connected to said first and said second outputs of said threshold device; said first output of each switch being connected to the input of the switch following it in the cascade, and said second output to said input of the flip-flop associated to said following switch; a transducer, for transducing said respective states of said flip-flop devices into digits and said input voltage of said threshold device in an electrical signal; a transmitter for transmitting said digits and said electrical signal; a receiver for receiving said digits and said electrical signal, and having $n$ respective outputs for delivering said digits and a further output for delivering said signal; $n$ further stages, having an output for delivering a voltage analog to said magnitude, cascade connected between said last mentioned output and said further output of said receiver said stages respectively comprising a polarity inverter, having a polarity inverting position and a polarity non inverting position and an output, and an adder cell, having a first input connected to said output of said inverter, and a second input for receiving a voltage analog to $K/2^j$, $j$ being equal to 1 . . . $n$; said inverters having respective control for tripping them from one position to the other, said control means being respectively controlled by said $n$ outputs of said receiver.

7. A system for converting an analog value $x$, comprised between —K and +K, into a digital value $x$, said system comprising: $n$ cascade connected stages, said cascade having one input for receiving said analog value $x$, said stages respectively comprising a polarity inverter, having a first polarity inverting position and a second non polarity inverting position, an algebraically additive device coupled to said inverter and having means for receiving $K/2^m$, $m$ having in said stages respective values equal to 1 to $n$; $n$ flip-flop devices having a first and a second steady state; respective means for putting said polarity inverters in said first or second positions according to whether said flip-flop devices are respectively in their first or second state; said flip-flop devices having respective control inputs for tripping them from one of said states into the other; a threshold device having an input, coupled to said cascade and a first and a second output, said first output being coupled to said control input of one of said flip-flop devices; a cascade of switches having one input and two outputs for selectively coupling said second output to said control input or one of said flip-flop devices or to the next switch of said cascade; and means for respectively controlling said switches as a function of the state of said flip-flop devices.

8. A system for converting an analog value $x$, comprised between —K and +K, into a digital value $x$, said system comprising: $n$ cascade connected stages having one input for receiving said analog value $x$, respectively comprising a polarity inverter, having a first polarity inverting position and a second non polarity inverting position, a subtractor circuit coupled to said inverter and having means for receiving $K/2^m$, $m$ having in said stages respective values equal to 1 to $n$; $n$ flip-flop devices having a first and a second steady state; respective means for putting said polarity inverters in said first or second position according to whether said flip-flops are respectively in their first or second state; said flip-flop devices having respective control inputs for tripping them from one of said states into the other; a threshold device having an input, coupled to said cascade and a first and a second output, said first output being coupled to said control input of one of said flip-flop devices; a cascade of switches having one input and two outputs for selectively coupling said second output to said control input of one of said flip-flop devices or to the next switch of said cascade; and means for respectively controlling said switches as a function of the state of said flip-flop devices.

9. A system for converting an analog value $x$, comprised between —K and +K, into a digital value $x$, said system comprising: $r$ cascades of $q$ cascade connected stages, having one input for receiving said analog value $x$ and respectively comprising a polarity inverter having a first polarity inverting position and a second non polarity inverting position, an algebraically additive coupled to said inverter and having means for receiving $K/2^n$, $n$ having in said stages respective values equal to 1 to $r \times q$; $r$ pluralities of $q$ flip-flop devices having a first and a second steady state; respective means in each cascade for putting said polarity inverters in said first or second positions according to whether said flip-flops are respectively in their first or second state; said flip-flop devices having respective control inputs for tripping them from one of said states into the other; $r$ threshold devices having inputs respectively coupled to said $r$ cascades and a first and a second output, said first output being coupled to said control input of one of said flip-flop devices in each of said pluralities; $r$ cascades of cascade connected switches having respective inputs and two outputs for selectively coupling said second output to said control input of one of said flip-flop devices or to the next switch of the same cascade; and means for respectively controlling said switches as a function of the state of said flip-flops.

10. A system for converting an analog value $x$, comprised between +K and −K, into a digital value $x$, said system comprising one input for receiving said analog value, and connected to said one input: $n$ cascade connected stages, respectively comprising a polarity inverter having a first polarity inverting position and a second non polarity inverting position; a subtractor coupled to said inverter and having means for receiving $K/p^m$, $m$ having in said stages respective values equal to 1 to $n$, $n$ flip-flop devices having a first and a second steady state; respective means for putting said polarity inverters in said first or second positions according to whether said flip-flops are respectively in their first or second state; said flip-flop devices having respective control inputs for tripping them from one of said states into the other; a cascade of $n$ further polarity inverters, similar to said polarity inverters, coupled in series to said cascade; a threshold device having an input, coupled to said further cascade and a first and a second output, said first output being coupled to said control input of one of said flip-flop devices; a cascade of switches having one input and two outputs for selectively coupling said second output to said control input of one of said flip-flop devices or to the next switch of said cascade; and means for respectively controlling said switches as a function of the state of said flip-flop devices.

References Cited by the Examiner

UNITED STATES PATENTS 2,733,432 1/1956 Breckman ---------- 340—347

MAYNARD R. WILBUR, *Primary Examiner.*

MALCOLM A. MORRISON, *Examiner.*

W. J. ATKINS, A. L. NEWMAN, *Assistant Examiners.*